(12) United States Patent
Halonen et al.

(10) Patent No.: US 11,739,676 B2
(45) Date of Patent: Aug. 29, 2023

(54) MIXER ARRANGEMENT AND A METHOD OF MIXING FOR AFTER-TREATMENT OF EXHAUST GAS

(71) Applicant: Proventia Oy, Oulunsalo (FI)

(72) Inventors: Sauli Halonen, Oulunsalo (FI); Tuomas Tyni, Oulunsalo (FI); Jukka Kurikka, Oulunsalo (FI); Juha Karhu, Oulunsalo (FI)

(73) Assignee: Proventia Oy, Oulunsalo (FI)

( * ) Notice: Subject to any disclaimer, the term of this patent is extended or adjusted under 35 U.S.C. 154(b) by 0 days.

(21) Appl. No.: 17/608,017

(22) PCT Filed: May 20, 2020

(86) PCT No.: PCT/FI2020/050338
§ 371 (c)(1),
(2) Date: Nov. 1, 2021

(87) PCT Pub. No.: WO2020/240082
PCT Pub. Date: Dec. 3, 2020

(65) Prior Publication Data
US 2022/0298948 A1    Sep. 22, 2022

(30) Foreign Application Priority Data

May 24, 2019   (FI) ..................................... 20195431

(51) Int. Cl.
*F01N 3/28* (2006.01)
*F01N 13/00* (2010.01)
(Continued)

(52) U.S. Cl.
CPC ....... *F01N 3/2892* (2013.01); *B01D 53/9418* (2013.01); *B01D 53/9431* (2013.01);
(Continued)

(58) Field of Classification Search
CPC .......... B01F 2025/913; B01F 2025/931; B01F 23/2132; B01F 25/102; B01F 25/103;
(Continued)

(56) References Cited

U.S. PATENT DOCUMENTS 5,138,834 A * 8/1992 Maund ...................... F01N 3/28
60/299
5,293,744 A * 3/1994 Imagawa .............. F01N 3/2882
181/240
(Continued)

FOREIGN PATENT DOCUMENTS

DE           4012411 A1    10/1991
DE     102009007355 A1     8/2009
(Continued)

OTHER PUBLICATIONS

Finnish Patent and Registration Office, U.S. Appl. No. 20/195,431, dated Dec. 12, 2019, 2 pages.
(Continued)

*Primary Examiner* — Jesse S Bogue
(74) *Attorney, Agent, or Firm* — Ziegler IP Law Group

(57) ABSTRACT

A mixer arrangement for aftertreatment of exhaust gas including a housing configured to form a cavity including a center flow channel in which the exhaust gas flows; and at least one side inlet arrangement configured to allow the exhaust gas to enter the center flow channel from the sides thereof and configured to cause an advancing center flow in the center flow channel and a rotating flow around or on the edges of the center flow in the center flow channel; wherein the at least one side inlet arrangement contains at least a pair of side inlet pipes on the side of the center flow channel.

20 Claims, 5 Drawing Sheets

(51) Int. Cl.
*B01F 25/313* (2022.01)
*B01F 25/10* (2022.01)
*B01F 23/213* (2022.01)
*B01D 53/94* (2006.01)
*F01N 3/021* (2006.01)
*F01N 3/20* (2006.01)
*B01F 25/00* (2022.01)

(52) U.S. Cl.
CPC ...... *B01D 53/9477* (2013.01); *B01F 23/2132* (2022.01); *B01F 25/102* (2022.01); *B01F 25/103* (2022.01); *B01F 25/3131* (2022.01); *F01N 3/021* (2013.01); *F01N 3/2066* (2013.01); *F01N 13/009* (2014.06); *B01F 2025/913* (2022.01); *F01N 2610/02* (2013.01); *F01N 2610/1453* (2013.01)

(58) Field of Classification Search
CPC ............ B01F 25/3131; B01D 53/9418; B01D 53/9431; B01D 53/9477; F01N 13/009; F01N 2610/02; F01N 2610/1453; F01N 3/021; F01N 3/2066; F01N 3/2892
See application file for complete search history.

(56) References Cited

U.S. PATENT DOCUMENTS

| | | | | |
|---|---|---|---|---|
| 5,388,407 A * | 2/1995 | Capers | ...................... | F01N 3/20 |
| | | | | 60/323 |
| 5,916,134 A * | 6/1999 | Yang | ...................... | F01N 3/2892 |
| | | | | 60/299 |
| 6,796,296 B2 * | 9/2004 | Kim | ........................ | F02B 27/04 |
| | | | | 123/184.21 |
| 7,243,641 B2 * | 7/2007 | Zukouski | ......... | F02M 35/10222 |
| | | | | 123/590 |
| 7,351,383 B2 * | 4/2008 | Jobson | .................. | F01N 3/2817 |
| | | | | 422/177 |
| 7,971,433 B2 * | 7/2011 | Kabat | .................. | F01N 3/2066 |
| | | | | 60/287 |
| 8,756,923 B2 * | 6/2014 | Tamamidis | ........... | F01N 3/2892 |
| | | | | 181/251 |
| 8,938,954 B2 * | 1/2015 | De Rudder | ............... | F01N 3/28 |
| | | | | 60/323 |
| 9,194,267 B2 | 11/2015 | Loman | | |
| 9,670,811 B2 * | 6/2017 | De Rudder | ........... | B01F 25/102 |
| 9,790,833 B2 * | 10/2017 | Kobe | .................. | B01F 25/4314 |
| 9,885,270 B2 * | 2/2018 | Singh | .................... | F01N 3/0226 |
| 11,110,408 B2 * | 9/2021 | Kurpejovic | ......... | B01F 25/4522 |
| 11,187,136 B2 * | 11/2021 | Scanlon | .................. | F01N 1/085 |
| 2003/0015596 A1 * | 1/2003 | Evans | .................... | F02M 26/36 |
| | | | | 239/468 |
| 2007/0095056 A1 * | 5/2007 | Richter | .................. | F02B 27/04 |
| | | | | 60/323 |
| 2010/0212301 A1 | 8/2010 | Rudder et al. | | |
| 2011/0308234 A1 | 12/2011 | Rudder et al. | | |
| 2014/0325967 A1 | 11/2014 | Kimura | | |
| 2015/0044103 A1 | 2/2015 | Sampath et al. | | |
| 2015/0211404 A1 | 7/2015 | Blaisdell et al. | | |
| 2018/0112571 A1 | 4/2018 | Oohara et al. | | |

FOREIGN PATENT DOCUMENTS

| | | |
|---|---|---|
| DE | 102017101749 A1 | 4/2017 |
| EP | 2204556 A1 | 7/2010 |
| EP | 2314837 A1 | 4/2011 |
| GB | 2533790 A | 7/2016 |
| JP | 5004308 B2 | 8/2012 |
| WO | 2015076765 A1 | 5/2015 |

OTHER PUBLICATIONS

Notification of Transmittal of The International Search Report and The Written Opinion of the International Searching Authority, or the Declaration, Application No. PCT/FI2020/050338, dated Sep. 7, 2020, 6 pages.

Written Opinion of the International Searching Authority, Application No. PCT/FI2020/050338, dated Sep. 7, 2020, 8 pages.

* cited by examiner

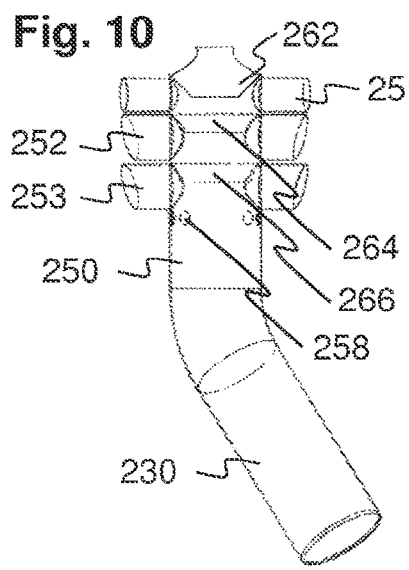
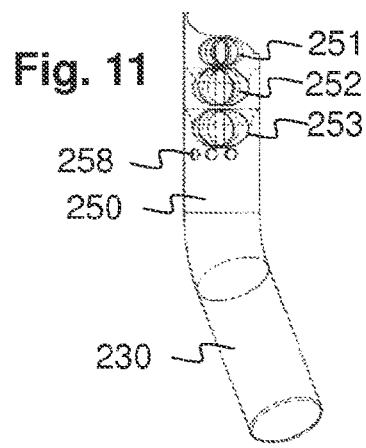
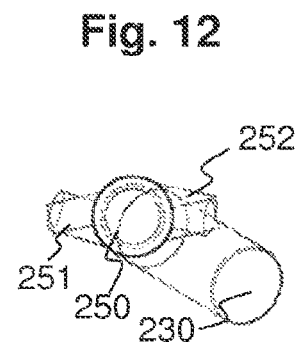
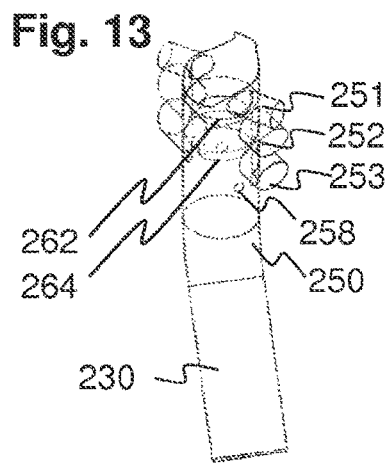
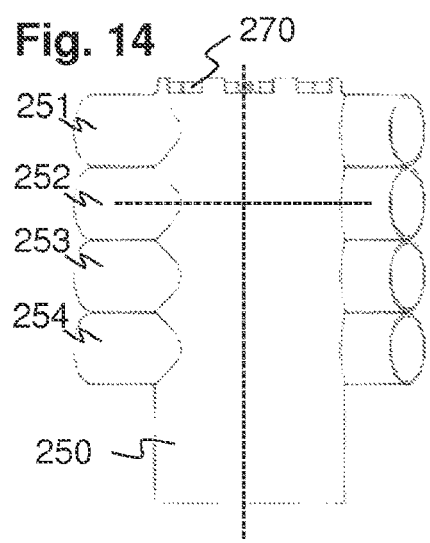
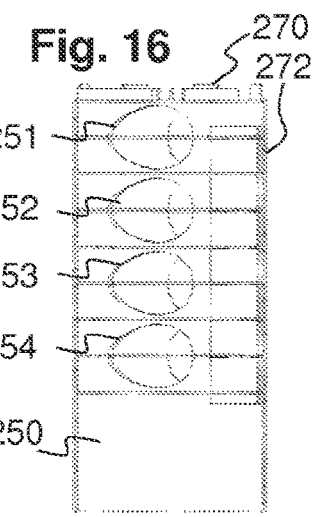
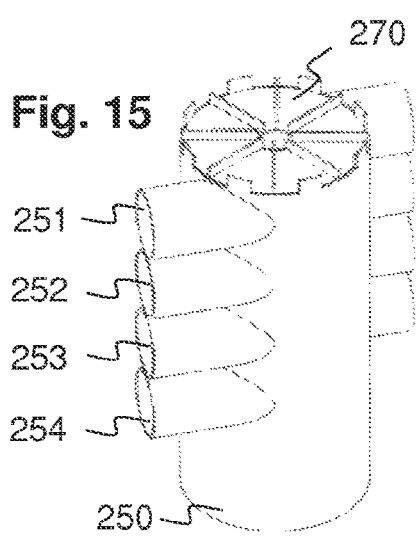
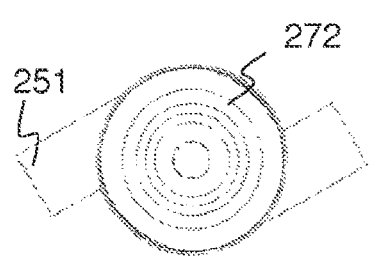
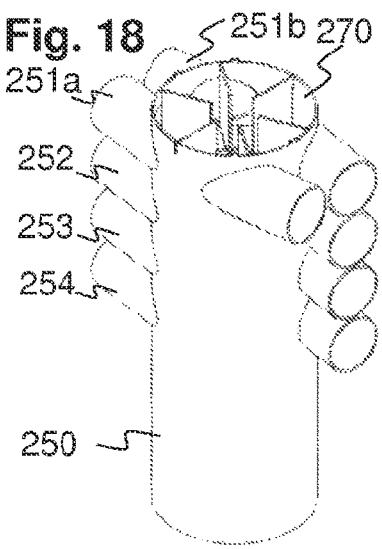

MIXER ARRANGEMENT AND A METHOD OF MIXING FOR AFTER-TREATMENT OF EXHAUST GAS

TECHNICAL FIELD

The present disclosure generally relates to a mixer arrangement and a method of mixing for aftertreatment of exhaust gas.

BACKGROUND

Emission regulations for internal combustion engines have tightened over recent years, and the trend is even tightening. For example, regulated emissions of NOx and particles from internal combustion engines are becoming so low that the target emissions levels are hard to be met. Therefore, aftertreatment systems are used in engines to reduce emissions. For reducing NOx emissions, NOx reduction catalysts, including selective catalytic reduction (SCR) systems, are utilized to convert NOx (NO and NO2) to N2 and other compounds. SCR systems utilize a reactant, such as ammonia, to reduce the NOx.

Simultaneously with the emission regulation demands, also power and efficiency demand for engines increase. On top of that the internal combustion engines should be designed and manufactured with smaller size and decreased weight, if possible.

Solutions increasing the efficiency of SCR systems by enhancing the mixing of reactants using a predetermined flow pattern are known. Such solutions apply flow guide elements such as fins and perforated conical elements in order to produce a flow enhancing mixing. Such solution of then require a lot of space and accordingly are not applicable to all situations.

A solution is needed for cost-efficiently providing an aftertreatment system of exhaust gas for internal combustion engine to reduce emissions capable of fulfilling the requirements for emission regulations without sacrificing too much power and efficiency of the engine and do all this in compact size and ease of manufacture and assembly.

SUMMARY

According to a first example aspect of the disclosed embodiments there is provided a mixer arrangement for aftertreatment of exhaust gas comprising:
a housing configured to form a cavity comprising a center flow channel in which the exhaust gas flows; and
at least one side inlet arrangement configured to allow the exhaust gas to enter the center flow channel from the sides thereof and configured to cause an advancing center flow in the center flow channel and a rotating flow around or on the edges of the center flow in the center flow channel; wherein
the at least one side inlet arrangement comprises at least a pair of side inlet pipes on the side of the center flow channel.

The mixer arrangement may further comprise at least one flow guide element within the center flow channel.

The at least one flow guide element may comprise at least one funnel element positioned substantially at the level of the at least one side inlet arrangement.

The at least one flow guide element may comprise at least one ring-like element.

The at least one flow guide element may comprise a perforated cone element.

The at least one flow guide element may comprise guide plates dividing the center flow channel.

The at least one flow guide element may comprise curved fins in a circular configuration.

The at least one flow guide element may comprise fins protruding towards the centerline of the center flow channel.

The mixer arrangement may comprise one or more upper holes defined by the center flow channel. The one or more upper holes may be configured to feed exhaust gas to the advancing center flow in the center flow channel.

The mixer arrangement may comprise one or more supplementary holes defined by the center flow channel. The one or more supplementary holes may be configured to feed exhaust gas to the advancing center flow in the center flow channel.

The one or more upper holes and/or the one or more supplementary holes may be configured to feed the exhaust gas in the advancing center flow from a direction perpendicular to the center flow channel.

The mixer arrangement may comprise a plurality of side inlet arrangements.

The side inlet pipes of any of the side inlet arrangements may be positioned on the opposite sides of the center flow channel.

The side inlet pipes of any of the side inlet arrangements may be positioned in an offset position from the centerline of the center flow channel.

The side inlet pipes of any of the side inlet arrangements may be perpendicular with respect to the advancing flow direction in the center flow channel.

The side inlet pipes of any of the side inlet arrangements may be at an angle with respect to the advancing flow direction in the center flow channel and/or at an angle with respect to a plane perpendicular to the advancing flow direction in the center flow channel.

The mixer arrangement may further comprise an injector element configured to inject a reactant, such as urea or ammonia, into the advancing and rotating flow in the center flow channel.

According to a second example aspect of the disclosed embodiments there is provided an apparatus for aftertreatment of exhaust gas, comprising
the mixer arrangement of the first example aspect of the disclosed embodiments; and further comprising at least one of the following upstream of the mixer arrangement
a diesel oxidation catalyst (DOC) substrate; and
a diesel particulate filter (DPF).

The apparatus may further comprise a selective catalytic reduction (SCR) substrate downstream of the mixer arrangement.

According to a third example aspect of the disclosed embodiments there is provided an engine system comprising a mixer arrangement of the first example aspect or an apparatus for aftertreatment of exhaust gas of the second aspect.

According to a fourth example aspect of the disclosed embodiments there is provided a method of mixing for aftertreatment of exhaust gas, comprising:
guiding at least a part of the exhaust gas into the center flow channel through at least one side inlet arrangement comprising at least a pair of side inlet pipes on the side of the center flow channel in order to form an advancing center flow in the center flow channel and a rotating flow on the edges of or around the advancing flow in the center flow channel;

injecting a reactant, such as urea or ammonia, with an injection element into the established exhaust gas flow in the center flow channel; and mixing the reactant with the exhaust gas flow in the center flow channel.

Different non-binding example aspects and embodiments of the present disclosure have been illustrated in the foregoing. The above embodiments are used merely to explain selected aspects or steps that may be utilized in implementations of the present disclosure. Some embodiments may be presented only with reference to certain example aspects of the disclosed embodiments. It should be appreciated that corresponding embodiments may apply to other example aspects as well.

BRIEF DESCRIPTION OF THE FIGURES

Some example embodiments will be described with reference to the accompanying figures, in which:

FIG. 10 shows a schematic view of a part of a mixer arrangement for exhaust gas aftertreatment according to an example embodiment of the present disclosure;

FIG. 11 shows a schematic view of a part of a mixer arrangement for exhaust gas aftertreatment according to an example embodiment of the present disclosure;

FIG. 12 shows a schematic top view of a part of a mixer arrangement for exhaust gas aftertreatment according to an example embodiment of the present disclosure;

FIGS. 13 to 25 and FIGS. 27 to 29 show schematic views of different parts of a mixer arrangement for exhaust gas aftertreatment according to different example embodiments of the present disclosure.

DETAILED DESCRIPTION

Figure 1:
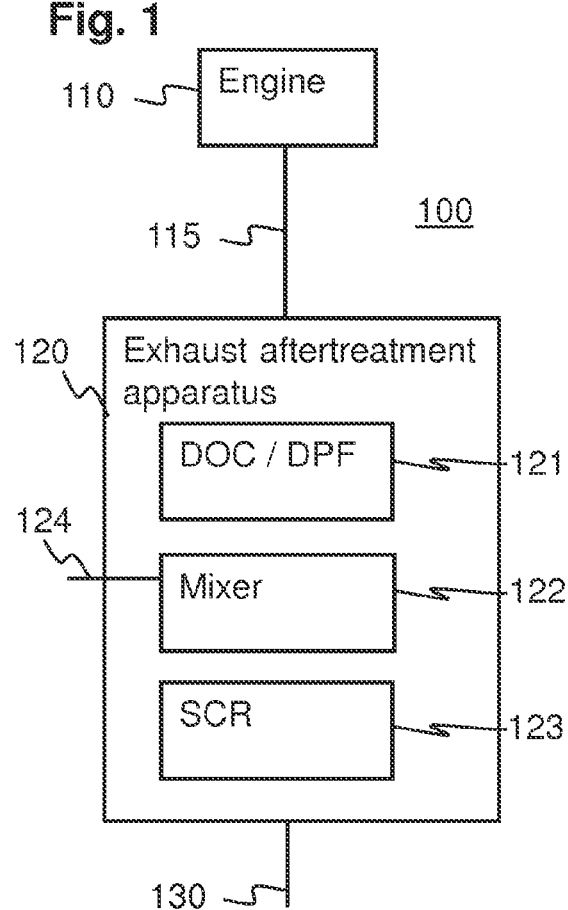
FIG. 1 shows a schematic view of an exhaust gas aftertreatment according to an example embodiment of the present disclosure.

FIG. 1 shows a schematic picture of exhaust gas aftertreatment system according to an example embodiment of the present disclosure. An engine system 100 is shown. The engine system 100 comprises an engine 110 and an exhaust aftertreatment apparatus 120. Furthermore, the system 100 may comprise other devices that are not shown in the FIG. 1. Such devices comprise, for example, a fuel storage for the engine 110 (e.g. diesel), and an air intake device including an air filter.

FIG. 1 shows a connection 115 between the engine 110 and the exhaust aftertreatment apparatus 120. The connection 115 may comprise a pipe for guiding exhaust gas from the engine 110, for example.

The exhaust aftertreatment apparatus 120 that receives the exhaust gas from the engine 110 over the connection 115. In an embodiment, the apparatus 120 comprises a catalytic converter, such as diesel oxidation catalyst (DOC) device 121, a mixer 122 and a selective catalytic reduction (SCR) device 123. The devices 121-123 are in an embodiment implemented within the same housing of the apparatus 120 but at least one of the devices 121, 123 may also be placed outside the housing of the apparatus 120. A connection 124 for receiving reactant for the mixer 122 is also disclosed. The apparatus 120 may further comprise devices not shown in FIG. 1, such as a doser for the reactant, a storage for the reactant (such as urea or ammonia), gas flow guides and connections within the apparatus 120.

Catalytic converters (diesel oxidation catalysts or DOC's) 121 are typically used in an exhaust system to convert undesirable gases such as carbon monoxide and hydrocarbons from engine's exhaust into carbon dioxide and water. DOC's may have different configurations. The substrates used in catalytic converters preferably include a catalyst.

A diesel particulate filter (DPF) may also be implemented together or alternatively to the DOC 121 in an exhaust system to remove particulate matter (e.g., carbon based particulate matter such as soot) from the exhaust. DPF's can have a variety of known configurations.

The selective catalytic reduction (SCR) catalyst device 123 is typically used in an exhaust system to remove undesirable gases such as nitrogen oxides (NOx) from the engine's emissions. SCR's are capable of converting NOx to nitrogen and oxygen in an oxygen rich environment with the assistance of reactants such as urea or ammonia, which are injected into the exhaust gas upstream of the SCR device 123.

A mixer 122 is configured to receive exhaust gas from the engine 110 over connection 115, which gas is possibly run through a DOC 121 or DPF, as disclosed above. The mixer 122 receives also reactant, such as diesel exhaust fluid (DEF), over the connection 124, the reactant commonly referred to as AdBlue that is an aqueous urea solution made with 32.5% high-purity urea and 67.5% deionized water. DEF may be used as a consumable in selective catalytic reduction (SCR) in order to lower NOx concentration in the diesel exhaust emissions from diesel engines. The mixer 122 is configured to mix the exhaust gas and the reactant and also to reduce urea deposits in exhaust pipelines. When SCR process uses DEF, it can cause urea deposits in exhaust pipes, especially in off-road applications using airless DEF injectors. Larger DEF spray droplets might lead to wall wetting and film formation on exhaust pipe inner surfaces, causing deposits when the local temperatures are low. Urea deposit problems have become frequent and critical, and the mixer 122 is configured to keep pipelines clean by evenly distributing the reactant to the exhaust gas in the shortest possible pipe length and avoiding this way the wall wetting and film formation.

The apparatus 120 may also help water evaporation from DEF and ensures optimal reactions with the reactant with no unwanted side effects. The apparatus 120 may be used with all reactant dosers (e.g. urea or ammonia) to achieve even NH3 distribution within the exhaust gas. Further benefit is experienced with airless injectors, which have rather large Sauter mean diameter (SMD) and when the injection must start at low temperatures. An exhaust gas outlet pipe 130 guides the aftertreated exhaust gas from the apparatus 120.

In an embodiment, the apparatus 120 is configured to inject small droplets of reactant, or catalyte, such as urea-water solution, to the exhaust gas flow and causing the reactant to vaporize in an exhaust gas flow channel defined by inner cavity of the apparatus housing and to react with the nitric oxides of the exhaust gas and changing them to plain nitrogen. Such final change to nitrogen takes place in SCR catalysator 123.

Figure 2:
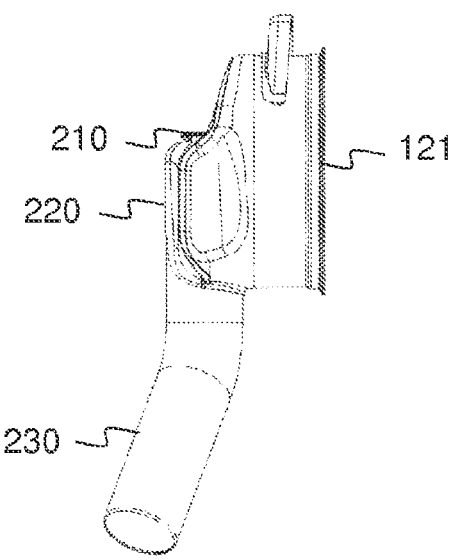
FIG. 2 shows a schematic side view of a mixer arrangement for exhaust gas aftertreatment according to an example embodiment of the present disclosure.

FIG. 2 shows a schematic side view of a mixer arrangement for exhaust gas aftertreatment according to an example embodiment of the disclosed embodiments. FIG. 2 shows the back side, i.e. the side of the DOC/DPF 121 of the mixer arrangement from which side the exhaust gas flows into the mixer arrangement. The mixer arrangement comprises a housing 220 configured to accommodate the elements of the mixer arrangement, i.e. in which the elements of the mixer arrangement are formed, and to form the cavity in which the exhaust gas flows. The housing 220 is configured to have a size smaller than the housing of the DOC/DPF system 121 so that the overall height of the exhaust gas aftertreatment system is not increased.

The mixer arrangement further comprises an injector element 210 at an end of the center flow channel 250 configured to inject a reactant, or catalyte, such as urea or ammonia, into the exhaust gas flow, in an embodiment substantially downstream. In an embodiment, the injector element 210 comprises an injector nozzle or nozzles. The mixer arrangement further comprises an exhaust outlet pipe 230 configured to guide the exhaust gas flow onwards from the mixing arrangement, for example into an SCR system.

Figure 3:
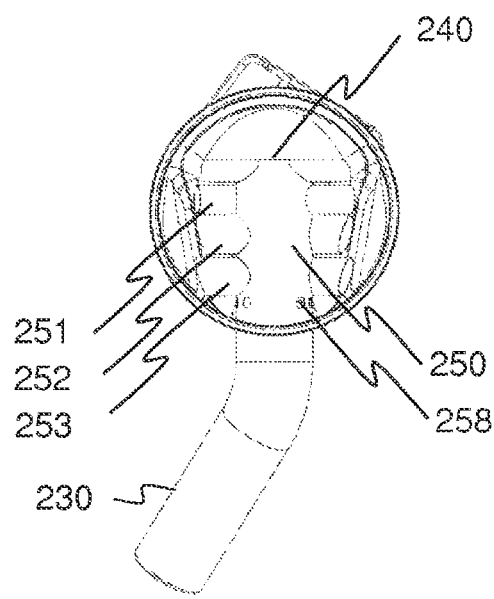
FIG. 3 shows a schematic back view of a mixer arrangement for exhaust gas aftertreatment according to an example embodiment of the present disclosure.

FIG. 3 shows a schematic back view, i.e. a view from the DOC/DPF side or inlet side, of the mixer arrangement for exhaust gas aftertreatment according to an example embodiment of the disclosed embodiments. In an embodiment, the mixer arrangement comprises a center inlet 240 configured to allow a part of the exhaust gas to enter a center flow channel 250. In an embodiment, the center inlet 240 and/or the center flow channel 250 has a circular cross-section. In an embodiment, the center inlet 240 comprises a perforated flow guide, for example a perforated sleeve surrounding the center inlet 240. In an embodiment, the injector element 210 is positioned at the center inlet and configured to inject the reactant into the center flow channel 250 substantially downstream into the exhaust gas flow in the center flow channel 250.

The mixer arrangement further comprises at least one side inlet arrangement 251-253. The at least one side inlet arrangement 251-253 comprises at least a pair of inlet pipes on the side of the center flow channel 250. In an embodiment, the side inlet pipes have a circular or rectangular cross-section. In an embodiment, the side inlet pipes are substantially perpendicular to the center flow channel. In a further embodiment, the side inlet pipes of the at least one side inlet arrangement 251-253 are positioned on the opposite sides of the center flow channel 250. In a further embodiment, the side inlet pipes of the at least one side inlet arrangement 251-253 are positioned in an offset position from the center line of the center flow channel 250, i.e. the side inlet pipes are positioned in such a way that the center line thereof does not dissect the center line of the center flow channel 250.

The at least one side inlet arrangement 251-253 is configured to allow at least a part of the exhaust gas to enter the center flow channel 250 from the sides thereof and configured to cause an advancing center flow in the center flow channel 250 and a rotating, or swirling flow, around or on the edges of the center flow in the center flow channel 250. Accordingly, the exhaust gas flow in the center flow channel 250 contains an advancing, and in an embodiment rotating, center flow substantially in the direction of the center flow channel 250 and a rotating flow on the edges thereof, the rotating flow, in an embodiment, also causing the advancing flow in the first direction while it advances to have a rotating flow component.

In an embodiment, the mixer arrangement comprises a plurality of side inlet arrangements 251-253, offset from each other in the longitudinal direction of the center flow channel 250. In an embodiment, the number of side inlet arrangements 251-253 is one, two or three. The mixer arrangement, in an embodiment, further comprises inlet holes 258 formed into the side of the pipe forming the center flow channel to allow at least some of the exhaust gas to enter the center flow channel 250. The inlet holes 258 are configured to lower the pressure opposing the flow of the exhaust gas through mixer arrangement and/or to allow raw exhaust gas, i.e. exhaust gas that has not yet cooled due to vaporizing the injected urea, into the center flow channel in order to improve mixing and urea vaporization.

Figure 27:
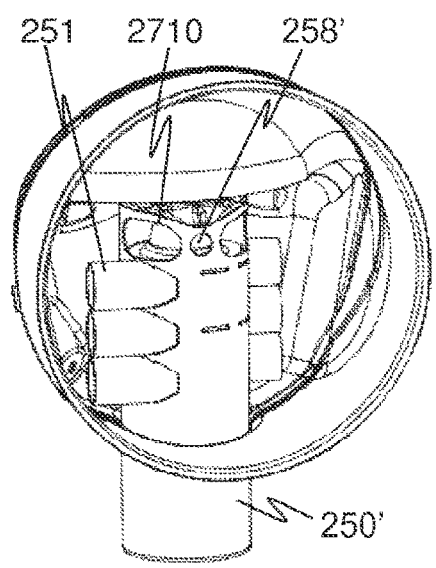
Figure 28:
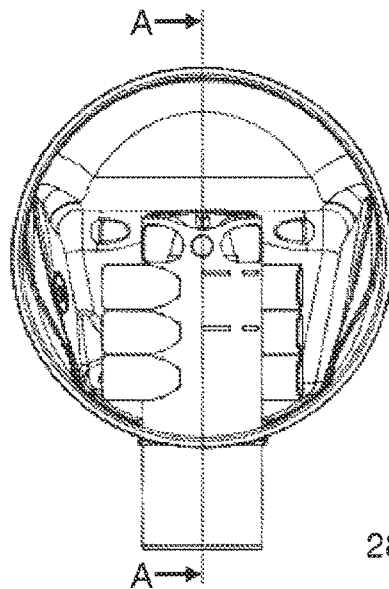
Figure 29:
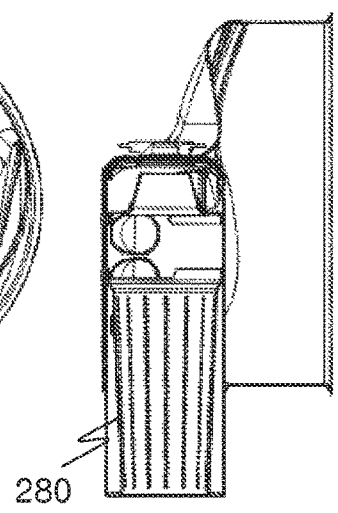

FIGS. 27 to 29 illustrate an embodiment of the mixer arrangement with one or more upper holes 258' and supplementary holes 2710 closer to the injector element 210 than the inlet 251-253 arrangements are. The upper holes 258' are in an embodiment configured to allow raw exhaust gas into the center flow channel in order to improve mixing and urea vaporization. In an embodiment, the upper holes 258' are configured to feed exhaust gas to the advancing center flow in the center flow channel 250. In an embodiment, the supplementary holes 2710 are configured to feed exhaust gas to the advancing center flow in the center flow channel 250. The supplementary holes 2710 may be located in succession with the side inlet arrangements 251-253, optionally with even alignment in terms of spacing and/or orientation regarding the center flow channel 250 (e.g., at same angular position with nearest inlet arrangement 251). The exhaust gas may be fed in the advancing center flow from a direction perpendicular to the center flow channel 250.

Figure 4:
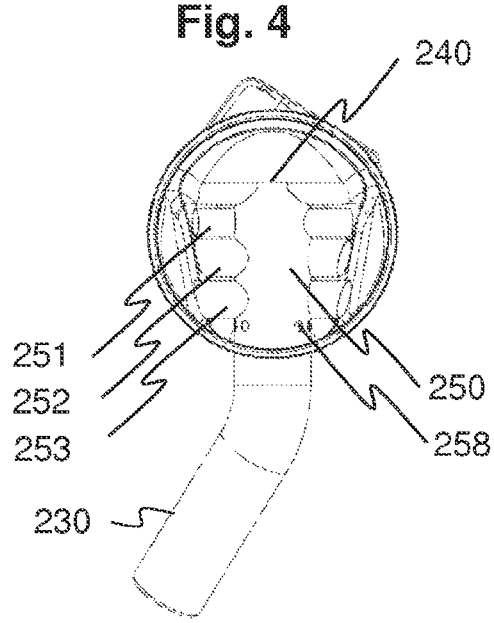
FIG. 4 shows a schematic front view of a mixer arrangement for exhaust gas aftertreatment according to an example embodiment of the present disclosure.

FIG. 4 shows a schematic front view of a mixer arrangement for exhaust gas aftertreatment according to an example embodiment of the present disclosure, i.e. a view from the side opposite to the DOC/DPF system. FIG. 4 shows the housing 220 of the mixer arrangement and the injection element 210 as well as the exhaust outlet 230.

Figure 5:
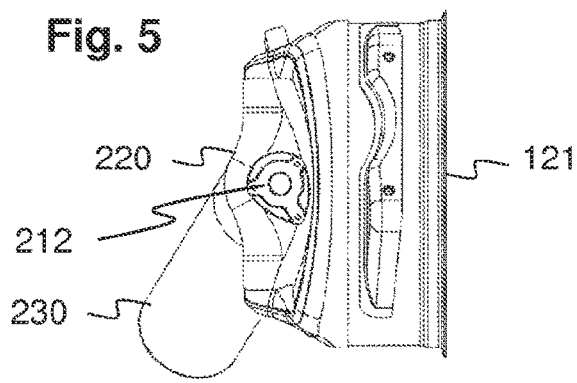
FIG. 5 shows a schematic top view of a mixer arrangement for exhaust gas aftertreatment according to an example embodiment of the present disclosure.

FIG. 5 shows a schematic top view of a mixer arrangement for exhaust gas aftertreatment according to an example embodiment of the present disclosure. FIG. 5 shows the housing 220 of the mixer arrangement and a cradle 212 thereon for accommodating the injector element 210 (not shown in FIG. 5).

Figure 6:
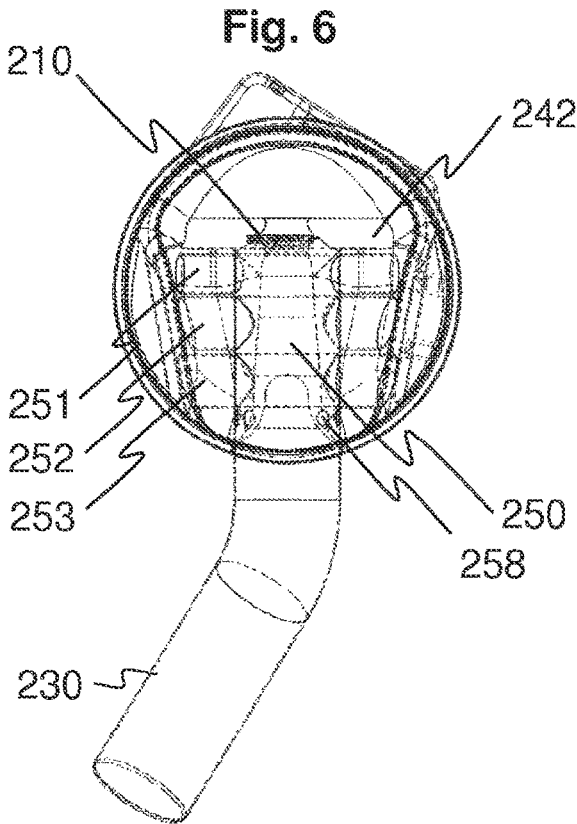
FIG. 6 shows a schematic back view of a mixer arrangement for exhaust gas aftertreatment according to an example embodiment of the present disclosure.

FIG. 6 shows a schematic back view of a mixer arrangement for exhaust gas aftertreatment according to an example embodiment of the present disclosure. FIG. 6 shows the injector element 210 on an end of the center flow channel. FIG. 6 further shows the at least one side inlet arrangement 251-253 and the inlet holes 258. An advancing flow in a first direction and a rotating flow the center flow by the exhaust gas entering the center flow channel through the at least one side inlet arrangement 251-253. In an embodiment, at least a part of the exhaust gas enters through a center inlet 240. The injector element 210 is configured to inject a reactant, or catalyte, such as urea or ammonia, into the advancing and rotating flow in the center flow channel 250. The exhaust gas is configured exit the mixer arrangement via the exhaust outlet 230.

FIG. 6 further shows an inlet cavity 242 within the housing 220 of the mixer arrangement, into which the exhaust gas from the DOC/DPF system enters and from which it flows into the center flow channel 250.

Figure 7:
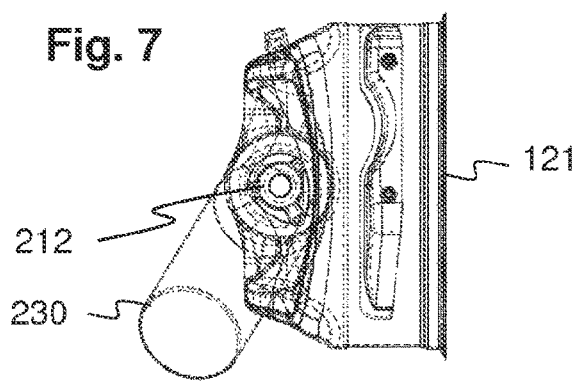
FIG. 7 shows a schematic top view of a mixer arrangement for exhaust gas aftertreatment according to an example embodiment of the present disclosure.

FIG. 7 shows a schematic top view of a mixer arrangement for exhaust gas aftertreatment according to an example embodiment of the present disclosure. FIG. 7 shows the cradle element 212 configured to accommodate the injector element 240 on top of the center inlet 240.

Figure 8:
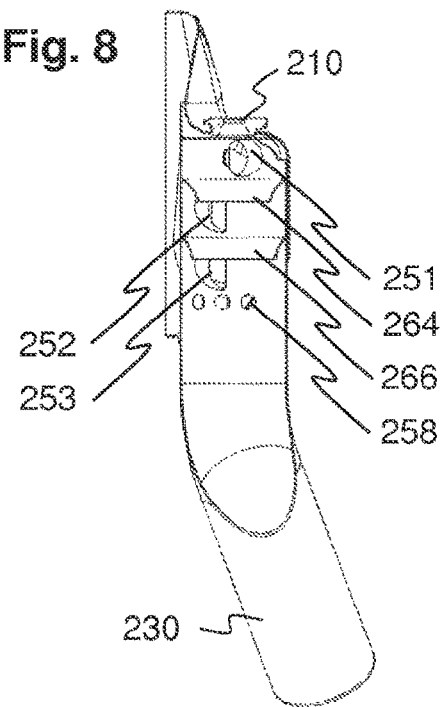
FIG. 8 shows a schematic side view of a mixer arrangement for exhaust gas aftertreatment according to an example embodiment of the present disclosure.

FIG. 8 shows a schematic side view of a mixer arrangement for exhaust gas aftertreatment according to an example embodiment of the present disclosure. FIG. 8 shows the injector element 210 on top of the center inlet. Furthermore, FIG. 8 shows the at least one side inlet arrangement 251-253, each side inlet arrangement in an embodiment comprising a pair of side inlet pipes on opposite sides of the center flow channel. In an embodiment, the side inlet pipes have a substantially circular cross-section. In an embodiment, the side inlet pipes are straight. In a further embodiment, as seen in FIG. 8, the side inlet pipes are curved, so that the opening on the end distant from the center flow channel points at a tangential direction with respect to the center flow channel in order to enhance the rotation of the flow within the central flow channel.

The mixer arrangement further comprises at least one flow guide element 264,266. In an embodiment, the flow guide element comprises a funnel element 264,266 within the center flow channel. The at least one funnel element is positioned substantially at the level of the at least one side inlet arrangement 251-253 and configured to increase the rotation caused by the flow through the at least one side inlet element 251-253. In an embodiment, the mixer arrangement comprises a plurality of funnel elements 264,266, for example two funnel elements, or a funnel element 264,266 positioned substantially at the level of each side inlet arrangement 251-253.

Figure 9:
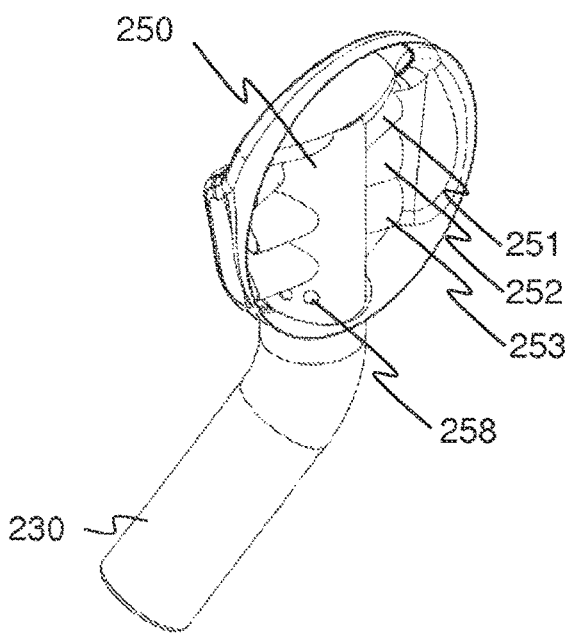
FIG. 9 shows a schematic back view of a mixer arrangement for exhaust gas aftertreatment according to an example embodiment of the present disclosure.

FIG. 9 shows a schematic back view of a mixer arrangement for exhaust gas aftertreatment according to an example embodiment of the present disclosure. FIG. 9 shoes the at least one side inlet arrangement 251-253, the inlet holes 258 and the central flow channel 250 as well as the exhaust outlet 230 as described in more detail hereinbefore and hereinafter.

FIGS. 10 to 13 show a schematic view of a part of a mixer arrangement for exhaust gas aftertreatment according to an example embodiment of the present disclosure. FIGS. 10 to 13 show the center flow channel 250 and the at least one side inlet arrangement 251-253 with the at least one funnel element 262-266 positioned at the level thereof within the center flow channel 250. As can be seen from FIGS. 10 to 13, in an embodiment with a plurality of side inlet arrangements 251-253, the size and angle with respect to the center flow channel or with respect to a plane perpendicular to the centerline of the center flow channel of each of the side inlet arrangements 251-253 may not be the same. Furthermore, in an embodiment, the at least on side inlet arrangement 251-253 has an opening not parallel to the centerline of the center flow channel, but angled in relation thereto. In a further embodiment, the center flow channel comprises a center inlet 240 the width of which is smaller than the width of the center flow channel 250.

As can be seen from FIGS. 10-13, the position and alignment of the side inlet arrangements 251-253, i.e. the angle of each side inlet pipe with respect to the flow direction and the position of each side inlet pipe with respect to the centerline of the center flow channel is not the same, i.e. the side inlet pipes are positioned according to the situation, for example so that a first side inlet arrangement 251 is positioned and angled in such a way that the flow entering therethrough enters substantially at a tangential direction with respect to the center flow channel 250 and a second side inlet arrangement 252 is positioned and angled in such a way that the flow entering therethrough enters in a direction towards the centerline of the center flow channel 250.

While FIGS. 10-13 show that the at least one side inlet arrangement 251-253 comprises a pair of side inlet pipes, the number of pipes in the at least one side inlet arrangement 251-253 is in an embodiment different, for example more than two side inlet pipes, in an embodiment for example four or six side inlet pipes.

An example of the dimensions of the mixer arrangement is as follows: In an example situation in which the mixer arrangement is used with an engine with a power of ca. 150-250 kW, the diameter of the center flow channel 250 is between 80 and 120 mm, for example about 100 mm, and the diameter of a side inlet pipe is between 30 and 50 mm, for example about 38 mm.

FIGS. 14 to 17 show a schematic view of a part of a mixer arrangement for exhaust gas aftertreatment according to an example embodiment of the present disclosure. FIGS. 14 to 17 show the center flow channel 250 and the at least one side inlet arrangement 251-254. While FIGS. 14-17 show that the at least one side inlet arrangement 251-254 comprises a pair of side inlet pipes, the number of pipes in the at least one side inlet arrangement 251-254 is in an embodiment different, for example more than two side inlet pipes, in an embodiment for example four or six side inlet pipes. FIG. 14 further shows with a dashed line the centerline of the center flow channel 250 and an axis perpendicular thereto. It is to be noted that the at least one side inlet arrangement 251-254, or any inlet pipe of a side inlet arrangement, is in an embodiment at an angle with respect to the centerline and/or with respect to the axis perpendicular thereto.

FIGS. 14-17 further shows a flow guide element 270 on top of the center flow channel 250 configured to guide the exhaust gas entering from the at least one side inlet arrangement 251-254. In an embodiment, the flow guide element 270 comprises fin-like elements protruding from the sides of the center flow channel towards the center thereof. Furthermore, in an embodiment, the mixer arrangement comprises at least one further flow guide element 272. In an embodiment, the at least one flow guide element 272 comprises a plurality of ring-like elements in the center flow channel 250. In an embodiment the plurality of ring-like elements comprises concentric ring-like elements. In a still further embodiment, the central opening of the ring-like elements 272 grows smaller in the direction of the exhaust flow in the center flow channel 250.

Figure 19:
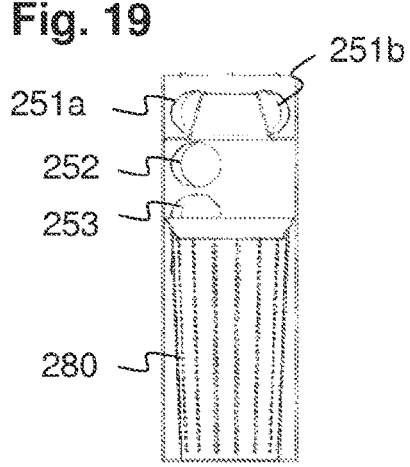

FIGS. 18 to 19 show a schematic view of a part of a mixer arrangement for exhaust gas aftertreatment according to an example embodiment of the present disclosure. FIGS. 18 to 19 show the center flow channel 250 and the at least one side inlet arrangement 251a-254. As can be seen from FIGS. 18 to 19, the at least one side inlet arrangement 151a-254 comprises a plurality of side inlet arrangements 251a-254, the size and angle with respect to the center flow varies. The embodiment of FIGS. 17-18 shows that the first side inlet arrangement 251a, 251b comprises four side inlet pipes, or two pairs thereof, with a different angle relative to the centerline of the center flow channel 250. While FIGS. 18-19 show that the further side inlet arrangements 252-254 comprises a pair of side inlet pipes, the number of pipes in the further side inlet arrangement 252-254 is in an embodiment different, for example more than two side inlet pipes, in an embodiment for example four or six side inlet pipes.

FIGS. 18-19 further show an inlet guide element 270 on top of the center flow channel 250 configured to guide the exhaust gas entering from the at least one side inlet arrangement 251-254. Furthermore, in an embodiment, the mixer arrangement comprises at least one flow guide element 280. In an embodiment, the at least one flow guide element 280 comprises a conical perforated element in the center flow channel 250. In an embodiment the diameter of the perforated conical flow guide element 280 grows smaller in the direction of the exhaust flow in the center flow channel 250.

Figure 20:
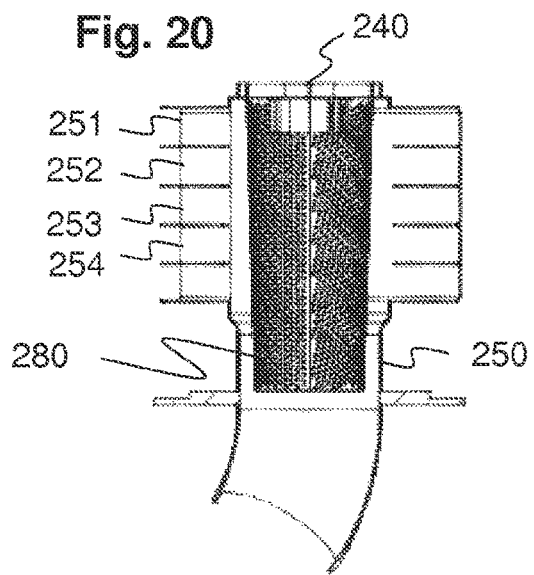
Figure 21:
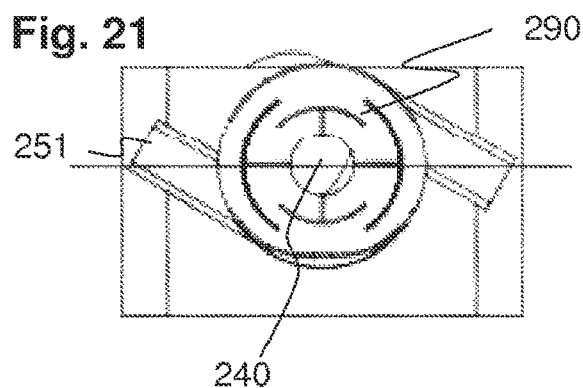
Figure 22:
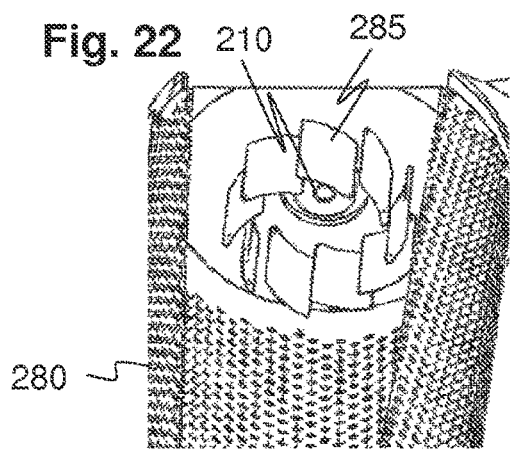

FIGS. 20-22 show a schematic view of a part of a mixer arrangement for exhaust gas aftertreatment according to an example embodiment of the present disclosure. FIGS. 20 to 22 show the center flow channel 250 and the at least one side inlet arrangement 251-254. FIGS. 20 to 22 show side inlet arrangements 251-254 the cross-section of the pipes of which is rectangular.

FIGS. 20-22 further show a center inlet 240 configured to allow at least a part of the exhaust gas to enter the center flow channel therethrough. Furthermore, Fig. shows a flow guide element 290 on top of the center flow channel 250 configured to guide the exhaust gas entering from the at least one side inlet arrangement 251-254 or from the center inlet 240. The flow guide element 290, in an embodiment, comprises flow guide plates configured to divide the cross-section of the center flow channel into smaller section in order to homogenize the flow and enhance mixing.

Furthermore, in an embodiment, the mixer arrangement of FIGS. 20-22 comprises at least one flow guide element 280. In an embodiment, the at least one flow guide element 280 comprises a conical perforated element in the center flow channel 250. In an embodiment the diameter of the perforated conical flow guide element 280 grows smaller in the direction of the exhaust flow in the center flow channel 250.

In a still further embodiment, the mixer arrangement of FIGS. 20-22 comprises at least one further flow guide element 285 shown in FIG. 22 in addition to or instead of the flow guide element 280. The flow guide element 285 comprises a plurality of curved fins in a circlelike configuration and is configured to enhance the rotation of the flow in the center flow channel 250 and/or to cause a counterrotation to the flow. It is to be noted, that the flow guide element 285 is in an embodiment combined with other flow guide elements described herein. In an embodiment, the flow guide element 285 is positioned around the injector element 210.

Figure 23:
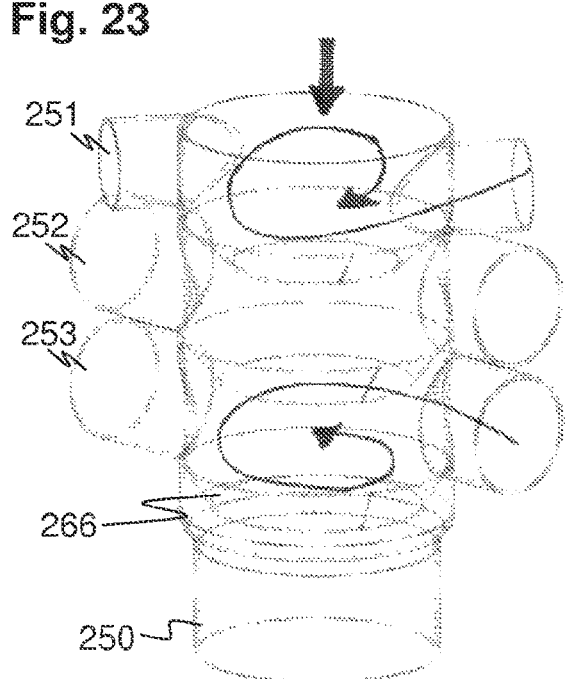
Figure 24:
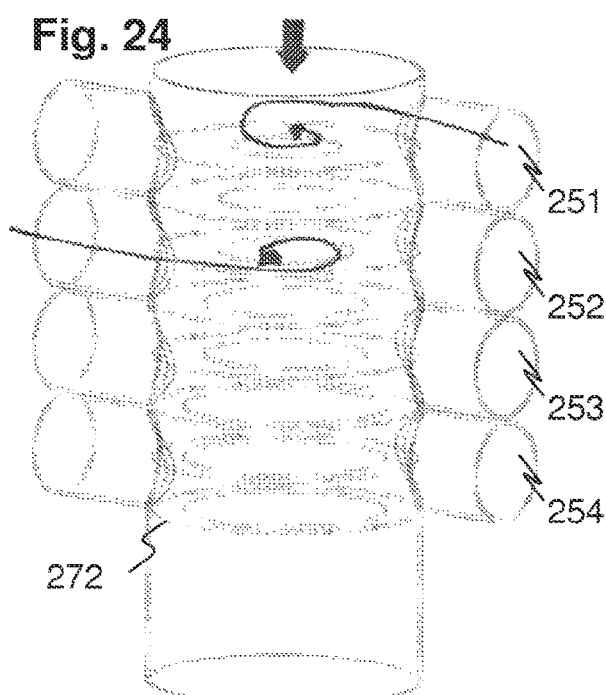
Figure 25:
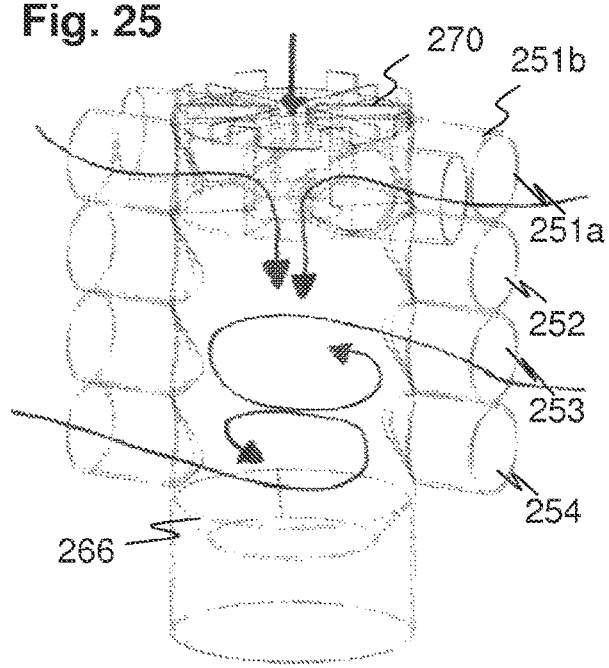

FIGS. 23-25 show examples of the flow in a mixer arrangement for exhaust gas aftertreatment according to an example embodiment of the present disclosure.

FIG. 23 shows with arrows how the flow entering through the at least one side inlet arrangement 251-253 enters in two directions of rotation depending on the angle of the at least one side inlet arrangement and combines to form an advancing and rotating flow in the center flow channel guided by the flow guide elements of which a funnel 266 is shown. Furthermore, the injection of the reactant, or catalyte, is shown with an arrow on top of FIG. 23.

FIG. 24 shows with arrows how the flow entering through the at least one side inlet arrangement 251-254 enters as rotating flow and combines to form an advancing and rotating flow in the center flow channel 250 guided by the flow guide elements of which a ring-like element 272 is shown. Furthermore, the injection of the reactant, or catalyte, is shown with an arrow on top of FIG. 24.

FIG. 25 shows with arrows how the flow entering through the at least one side inlet arrangement 251a-254 enters as rotating flow and combines to form an advancing and rotating flow in the center flow channel 250. The exhaust gas flow entering from the side inlet arrangement 251a, 251b is guided by the flow guide element 270 to increase the advancing flow. The combined rotating and advancing flow is further enhanced by the flow guide elements of which a funnel 266 is shown. Furthermore, the injection of the reactant, or catalyte, is shown with an arrow on top of FIG. 25.

Figure 26:
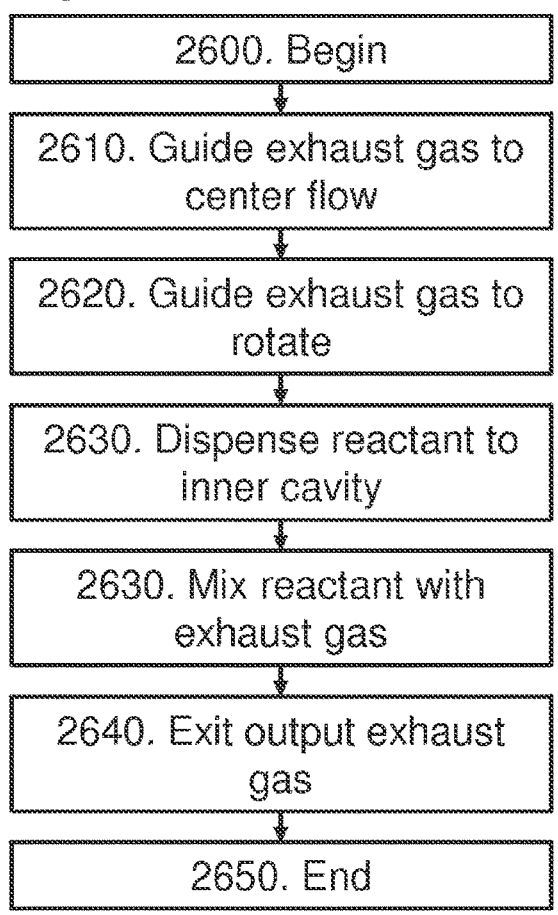
FIG. 26 shows a flow diagram showing operations in accordance with an example embodiment of the present disclosure.

FIG. 26 shows a flow diagram showing operations in accordance with an example embodiment of the present disclosure. At step 2600 the mixing process in the mixer arrangement according to an embodiment of the present disclosure begins, i.e. the exhaust gas from the DOC/DPF system enters the mixer arrangement. At steps 2610 and 2620 exhaust gas is guided into the center flow channel through the at least one side inlet arrangement 251-254, i.e. through the side inlet pipes in order to form an advancing center flow in the center flow channel 250 and a rotating flow on the edges of or around the advancing flow in the center flow channel 250 and, in an embodiment in order to cause the advancing flow as a whole to have a rotating flow component. Furthermore, the at least one funnel element 262-266 is configured to enhance the rotation of the flow. In an embodiment, at steps 2610 and 2620 a part of the exhaust gas is guided through the center inlet 240 into the center flow channel in order to form an advancing flow in the first direction in the center flow channel 250.

Simultaneously and/or subsequently with steps 2610 and 2620 reactant is injected into the established exhaust gas flow in the center flow channel 250 at step 2630 by the injection element 210. In an embodiment, the reactant is injected downstream from the center inlet opening. The reactant is mixed with the exhaust gas flow in the center flow channel 250 at step 2640. The exhaust gas and reactant mixture exit via the exhaust outlet 230 at step 2650 thus ending the process at step 2660.

Without in any way limiting the scope, interpretation, or application of the claims appearing below, a technical effect of one or more of the embodiments disclosed herein is fitting an effective mixer arrangement in a small space. Another technical effect of one or more of the embodiments disclosed herein is the provision of a mixer arrangement that is easy to manufacture and assemble as the side inlet pipes are easy and cost effective to manufacture compared to conventionally used curved flow guide plates requiring precise cutting. Another technical effect of one or more of the embodiments disclosed herein is the provision of an advancing and swirling flow without a large volume cavity. Another technical effect of one or more of the embodiments disclosed herein is the provision of a mixer arrangement with a robust structure and easy assembly. A still further technical effect of one or more of the embodiments disclosed herein is the provision of a mixer arrangement with scalability in view of different mass flows.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

The foregoing description has provided by way of non-limiting examples of particular implementations and embodiments a full and informative description of the best mode presently contemplated by the inventors for carrying out the disclosed embodiments. It is however clear to a person skilled in the art that the disclosed embodiments is not restricted to details of the embodiments presented in the foregoing, but that it can be implemented in other embodiments using equivalent means or in different combinations of embodiments without deviating from the characteristics of the disclosed embodiments.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the disclosed embodiments is only restricted by the appended patent claims.

The invention claimed is:

1. A mixer arrangement for aftertreatment of exhaust gas, comprising: a housing configured to form a cavity comprising a center flow channel pipe inside the housing in which the exhaust gas flows; and at least one side inlet arrangement configured to allow the exhaust gas to enter the center flow channel pipe from a side thereof and configured to cause an advancing center flow in the center flow channel pipe and a rotating flow around or on edges of the advancing center flow in the center flow channel pipe; wherein the at least one side inlet arrangement comprises at least a pair of side inlet pipes on the side of the center flow channel pipe; and the mixer arrangement further comprising one or more holes defined by the center flow channel pipe, configured to feed exhaust gas to the advancing center flow in the center flow channel pipe.

2. The mixer arrangement of claim 1, further comprising at least one flow guide element within the center flow channel pipe.

3. The mixer arrangement of claim 2, wherein the at least one flow guide element comprises a perforated cone element.

4. The mixer arrangement of claim 2, wherein the at least one flow guide element comprises at least one funnel element positioned substantially at the level of the at least one side inlet arrangement.

5. The mixer arrangement of claim 2, wherein the at least one flow guide element comprises at least one ring-like element.

6. The mixer arrangement of claim 2, wherein the at least one flow guide element comprises guide plates dividing the center flow channel pipe.

7. The mixer arrangement of claim 2, wherein the at least one flow guide element comprises curved fins in a circular configuration.

8. The mixer arrangement of claim 2, wherein the at least one flow guide element comprises fins protruding towards a centerline of the center flow channel pipe.

9. The mixer arrangement of claim 1, comprising a plurality of side inlet arrangements.

10. The mixer arrangement of claim 1, wherein the side inlet pipes of any of the side inlet arrangements are positioned on opposite sides of the center flow channel pipe.

11. The mixer arrangement of claim 1, wherein the side inlet pipes of any of the side inlet arrangements are positioned in an offset position from a centerline of the center flow channel pipe.

12. The mixer arrangement of claim 1, wherein the side inlet pipes of any of the side inlet arrangements are perpendicular with respect to an advancing center flow direction in the center flow channel pipe.

13. The mixer arrangement of claim 1, wherein the side inlet pipes of any of the side inlet arrangements are at an angle with respect to an advancing center flow direction in the center flow channel pipe and/or at an angle with respect to a plane perpendicular to the advancing center flow direction in the center flow channel pipe.

14. The mixer arrangement of claim 1, further comprising an injector element configured to inject a reactant into the advancing center flow and the rotating flow in the center flow channel.

15. The mixer arrangement of claim 14, wherein the reactant comprises urea or ammonia.

16. An apparatus for aftertreatment of exhaust gas, comprising:
the mixer arrangement of claim 1; and further comprising at least one of the following upstream of the mixer arrangement:
a diesel oxidation catalyst, DOC, substrate; and
a diesel particulate filter, DPF.

17. The apparatus of claim 12, further comprising a selective catalytic reduction, SCR, substrate downstream of the mixer arrangement.

18. An engine system, comprising the mixer arrangement of claim 1.

19. A method of mixing for aftertreatment of exhaust gas, comprising: guiding at least a part of the exhaust gas into a center flow channel pipe inside the housing through at least one side inlet arrangement comprising at least a pair of side inlet pipes on a side of the center flow channel pipe in order to form an advancing center flow in the center flow channel pipe and a rotating flow on edges on or around the advancing center flow in the center flow channel pipe; injecting a reactant with an injection element into the advancing center flow in the center flow channel pipe; mixing the reactant with the advancing center flow in the center flow channel pipe; and feeding exhaust gas to the advancing center flow in the center flow channel pipe with one or more holes defined by the center flow channel pipe.

20. The method of claim 19, wherein the reactant comprises urea or ammonia.

* * * * *